(12) United States Patent
Horne, Jr.

(10) Patent No.: US 11,219,959 B2
(45) Date of Patent: Jan. 11, 2022

(54) SAW BLADE AND SYSTEM AND METHOD FOR MANUFACTURING A SAW BLADE

(71) Applicant: MILWAUKEE ELECTRIC TOOL CORPORATION, Brookfield, WI (US)

(72) Inventor: James P. Horne, Jr., Greenwood, MS (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 659 days.

(21) Appl. No.: 15/497,426

(22) Filed: Apr. 26, 2017

(65) Prior Publication Data

US 2017/0225247 A1  Aug. 10, 2017

Related U.S. Application Data

(62) Division of application No. 14/215,179, filed on Mar. 17, 2014, now Pat. No. 9,662,725.

(60) Provisional application No. 61/787,755, filed on Mar. 15, 2013.

(51) Int. Cl.
| | |
|---|---|
| *B23D 61/12* | (2006.01) |
| *B23D 65/02* | (2006.01) |
| *B23D 61/02* | (2006.01) |

(52) U.S. Cl.
CPC ......... *B23D 61/123* (2013.01); *B23D 61/021* (2013.01); *B23D 61/121* (2013.01); *B23D 65/02* (2013.01); *Y10T 83/9319* (2015.04)

(58) Field of Classification Search
CPC ..... B23D 61/121; B23D 61/123; B23D 65/02

USPC .......................................................... 83/835
See application file for complete search history.

(56) References Cited

U.S. PATENT DOCUMENTS

| | | | |
|---|---|---|---|
| 57,205 A | 8/1866 | Sowden | |
| 269,728 A | 12/1882 | Simonds | |
| 1,250,377 A | 12/1917 | Stevens | |
| 1,932,223 A * | 10/1933 | Lundquist | B23D 65/02 407/117 |
| 2,510,462 A * | 6/1950 | Christenson | B23D 65/02 266/102 |
| 2,569,054 A | 9/1951 | Herzog | |
| 2,603,251 A * | 7/1952 | Christenson | B23D 65/02 83/835 |
| 2,710,501 A | 6/1955 | Hull | |
| 2,768,423 A * | 10/1956 | Stern | B23D 61/121 285/918 |
| 2,787,922 A | 4/1957 | Bien | |
| 2,935,902 A | 5/1960 | Ostberg | |
| 3,023,645 A | 3/1962 | Craven | |
| 3,063,310 A | 11/1962 | Connoy | |
| 3,117,472 A * | 1/1964 | Mingus | B23D 65/02 72/335 |

(Continued)

FOREIGN PATENT DOCUMENTS

DE  102011054648 A1 *  4/2013  ............. B21D 22/02

*Primary Examiner* — Ghassem Alie
(74) *Attorney, Agent, or Firm* — Michael Best & Friedrich LLP

(57) ABSTRACT

A saw blade blank includes a body having an edge and an attachment portion formed on the body. The attachment portion is configured to connect to a power tool. A first portion of the edge is set in a first direction relative to the body. A second portion of the edge is set in a second direction opposite the first direction relative to the body. No cutting teeth are formed on the edge of the body.

20 Claims, 5 Drawing Sheets

(56) References Cited

U.S. PATENT DOCUMENTS

| | | | | |
|---|---|---|---|---|
| 3,176,732 A | * | 4/1965 | Henderson | B23D 61/04 407/118 |
| 3,208,310 A | | 9/1965 | Dunn | |
| 3,540,317 A | | 11/1970 | Stanley | |
| 3,546,975 A | * | 12/1970 | Aijala | B23D 65/02 76/29 |
| 3,630,699 A | * | 12/1971 | Catlin | B23D 65/00 451/356 |
| 3,949,635 A | | 4/1976 | Daniels | |
| 4,027,941 A | | 6/1977 | Narozny | |
| 4,032,178 A | | 6/1977 | Neuroth | |
| 4,077,107 A | | 3/1978 | Reuter | |
| 4,223,821 A | | 9/1980 | Mccall | |
| 4,335,630 A | * | 6/1982 | Gunzner | B23D 65/04 409/190 |
| 4,345,499 A | | 8/1982 | Ross | |
| 4,589,306 A | * | 5/1986 | Danielsson | B27B 33/02 30/166.3 |
| 4,625,594 A | | 12/1986 | Janke | |
| 4,693,145 A | | 9/1987 | Gustavsson | |
| 4,958,546 A | * | 9/1990 | Yoshida | B23D 61/121 83/835 |
| 4,979,305 A | * | 12/1990 | Leini | B23D 49/006 30/369 |
| 5,012,664 A | | 5/1991 | Hembree | |
| 5,884,547 A | | 3/1999 | Carlsen | |
| 5,918,525 A | * | 7/1999 | Schramm | B23D 61/121 83/835 |
| 5,937,519 A | | 8/1999 | Strand | |
| 5,946,985 A | | 9/1999 | Carlsen | |
| 6,065,380 A | * | 5/2000 | Lundh | B23D 61/121 30/355 |
| 6,401,585 B1 | * | 6/2002 | Morgan | B23D 61/123 30/501 |
| 6,538,201 B1 | | 3/2003 | Gretz | |
| 6,670,553 B1 | | 12/2003 | Gretz | |
| 6,780,029 B1 | | 8/2004 | Gretz | |
| 6,991,488 B2 | | 1/2006 | Freakes | |
| 7,127,979 B2 | * | 10/2006 | Kocher | B23D 61/121 83/848 |
| 7,225,714 B2 | | 6/2007 | Rompel | |
| 7,494,157 B1 | | 2/2009 | Kiely | |
| 7,806,033 B2 | * | 10/2010 | Kocher | B23D 61/121 83/835 |
| 8,261,455 B2 | | 9/2012 | Henrickson | |
| 8,826,790 B2 | * | 9/2014 | Mabon | B23D 61/021 83/835 |
| 9,248,518 B2 | * | 2/2016 | Elliston | B23D 61/121 |
| 2002/0184988 A1 | * | 12/2002 | Rohman | B23D 61/123 83/835 |
| 2006/0016315 A1 | * | 1/2006 | Zorich | B23D 61/025 83/835 |
| 2011/0271815 A1 | * | 11/2011 | Elliston | B23D 61/121 83/835 |
| 2013/0133500 A1 | * | 5/2013 | Horiguchi | B23D 61/121 83/661 |
| 2013/0333541 A1 | * | 12/2013 | Karlen | B23D 65/00 83/835 |

* cited by examiner

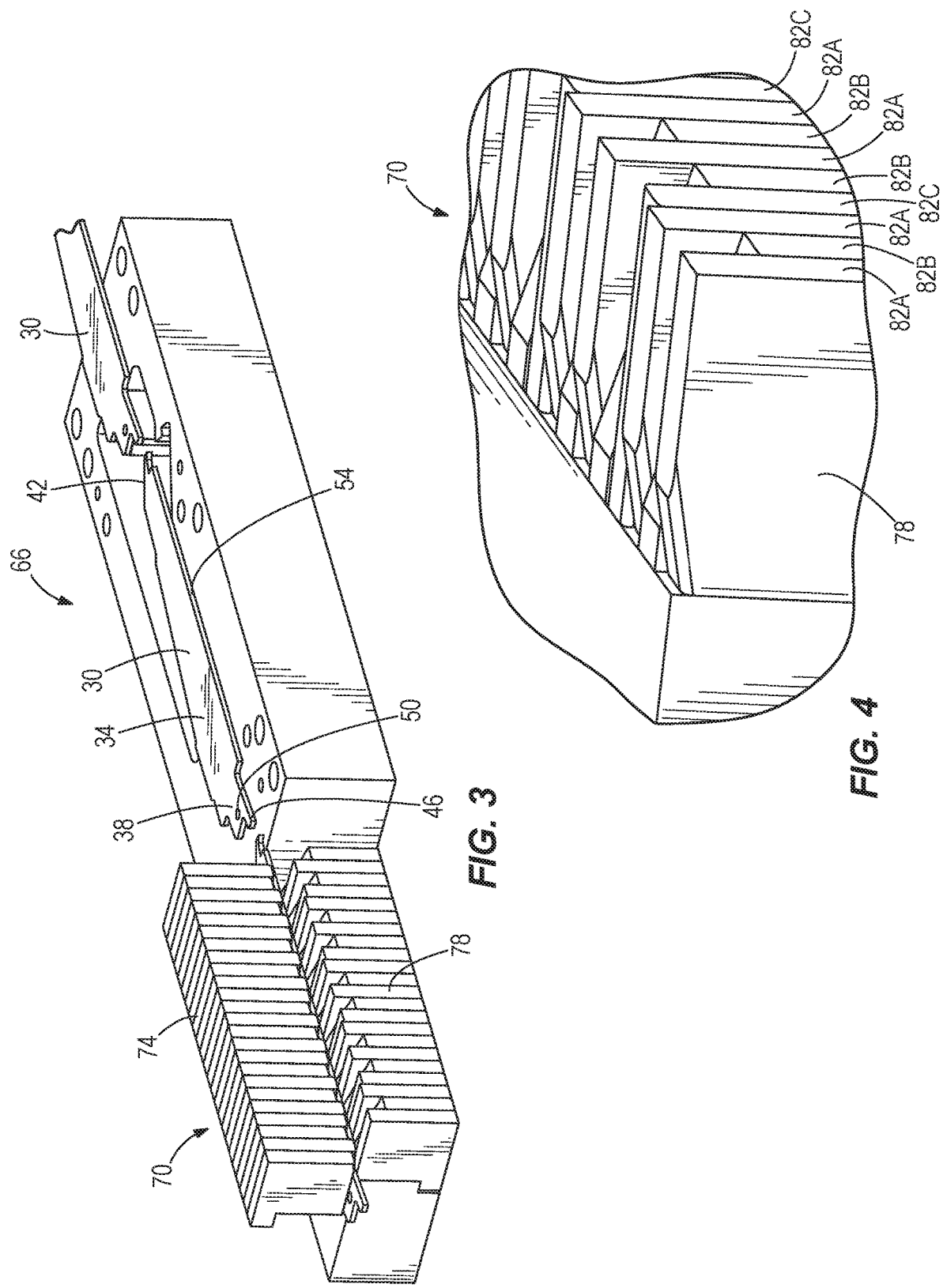

SAW BLADE AND SYSTEM AND METHOD FOR MANUFACTURING A SAW BLADE

CROSS-REFERENCE TO RELATED APPLICATIONS

This application is a divisional of U.S. patent application Ser. No. 14/215,179, filed Mar. 17, 2014, now U.S. Pat. No. 9,662,725, which claims priority to U.S. Provisional Patent Application No. 61/787,755, filed Mar. 15, 2013, the entire contents of both of which are incorporated by reference herein.

BACKGROUND

The present invention relates to saw blades and to systems and methods for manufacturing saw blades.

Traditionally, saw blades, such as reciprocating saw blades, jigsaw blades, and hole saws, are produced by first forming cutting teeth on coil stock and then setting the cutting teeth in a desired pattern. Setting is the process of bending the cutting teeth in opposing directions to provide kerf or clearance for a body of the saw blade during cutting. Setting typically involves striking each cutting tooth with an insert that is made from a harder material than the cutting tooth itself.

During setting, the hard insert initially comes into contact with a tip of the cutting tooth where a surface area of the cutting tooth is smallest. The insert presses against the cutting tooth until enough surface area is contacted to generate a force higher than the yield strength of the saw blade body at a bend point near a root of the cutting tooth. This process, however, may create undesirable deformations along a side face of the saw blade body and at the tip of the cutting tooth.

SUMMARY

In one embodiment, the invention provides a method of manufacturing a saw blade. The method includes providing a coil stock, setting a first portion of the coil stock in a first direction, setting a second portion of the coil stock in a second direction opposite the first direction, and forming a plurality of cutting teeth in the first portion and the second portion of the coil stock after the first and second portions are set.

In another embodiment, the invention provides a saw blade including a body having a thickness and an attachment portion formed on the body. The attachment portion is configured to connect the saw blade to a power tool. The saw blade also includes a plurality of cutting teeth formed on the body. Each cutting tooth includes a tip defining a plane that extends along the thickness of the body, a rake face extending from the tip, and a relief face extending from the tip opposite the rake face. A first cutting tooth of the plurality of cutting teeth is set in a first direction relative to the body, and a second cutting tooth of the plurality of cutting teeth is set in a second direction opposite the first direction relative to the body. The planes defined by the tips of the first and second cutting teeth are generally parallel.

In yet another embodiment, the invention provides a saw blade blank including a body having an edge and an attachment portion formed on the body. The attachment portion is configured to connect to a power tool. A first portion of the edge is set in a first direction relative to the body, and a second portion of the edge is set in a second direction opposite the first direction relative to the body. No cutting teeth are formed on the edge of the body.

Other aspects of the invention will become apparent by consideration of the detailed description and accompanying drawings.

BRIEF DESCRIPTION OF THE DRAWINGS

FIG. 3 illustrates a machine for setting the saw blade.

FIG. 4 is an enlarged view of a portion of the machine shown in FIG. 3.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
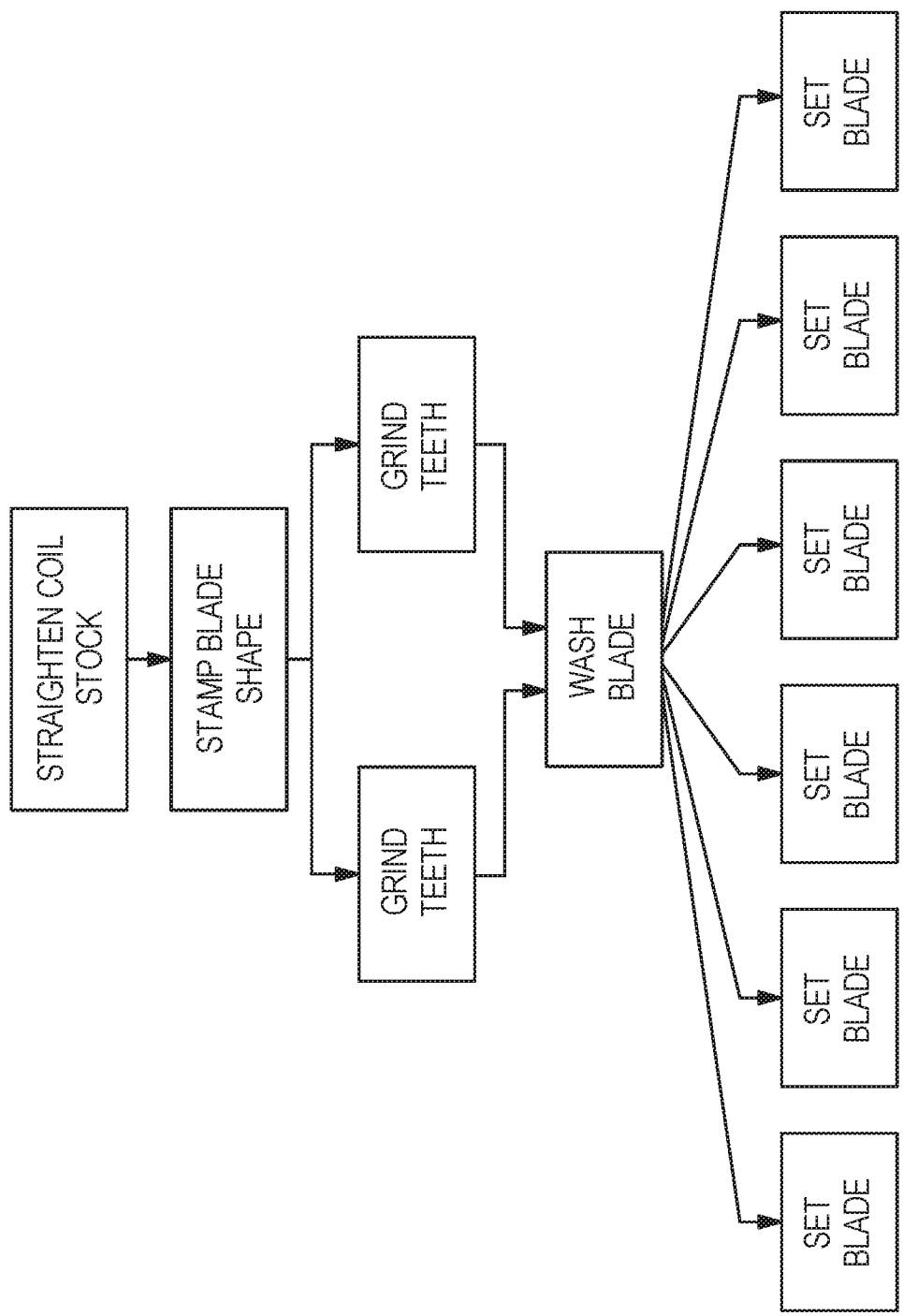
FIG. 1 is a flowchart depicting a conventional method of manufacturing a saw blade.

FIG. 1 illustrates an example of a conventional process of manufacturing a saw blade. As depicted in the flowchart, incoming coil stock is first straightened and blanked into a desired blade shape. The blank is then placed into a grinder to form cutting teeth on the blank. The illustrated process utilizes two grinders to form cutting teeth on two blanks simultaneously. After grinding, the saw blade is cleaned or washed to remove grinding debris and coolant residue. Once cleaned, the saw blade is loaded into a setting machine to set the cutting teeth to a desired specification. The illustrated process utilizes six setting machines, or stations, to keep up with the number of saw blades being output from the grinders.

Figure 2:
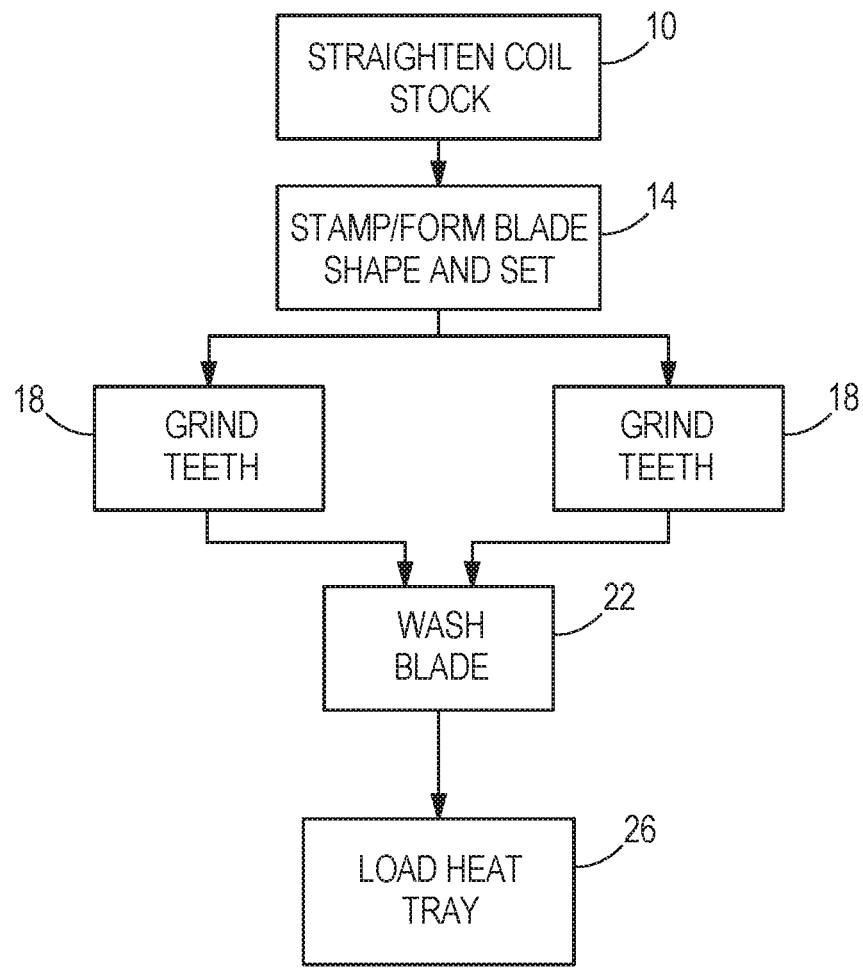
FIG. 2 is a flowchart depicting a method of manufacturing a saw blade according to one embodiment of the present invention.

FIG. 2 illustrates a process or method of manufacturing a saw blade according to the present invention. In general, the illustrated method includes a step 10 to straighten coil stock, a step 14 to form a blade blank from the coil stock, a step 18 to form cutting teeth on the blade blank, a step 22 to wash the saw blade, and a step 26 to load the saw blade into a heat tray. The process of FIG. 2 is different from the process of FIG. 1 in that setting occurs at step 14 before the cutting teeth are formed at step 18. In some embodiments, the process may omit one or more of the steps 10, 22, 26, yet still fall within the scope of the present invention.

Similar to the method of FIG. 1, at step 10, incoming coil stock is first uncoiled and generally straightened. The coil stock is a continuous sheet of metal that can be stamped, cut, or otherwise machined to form a saw blade. As used herein, "coil stock" refers to the material that is used to form the saw blade before the saw blade is complete (e.g., before the blade is fully formed with cutting teeth).

Figure 5A:
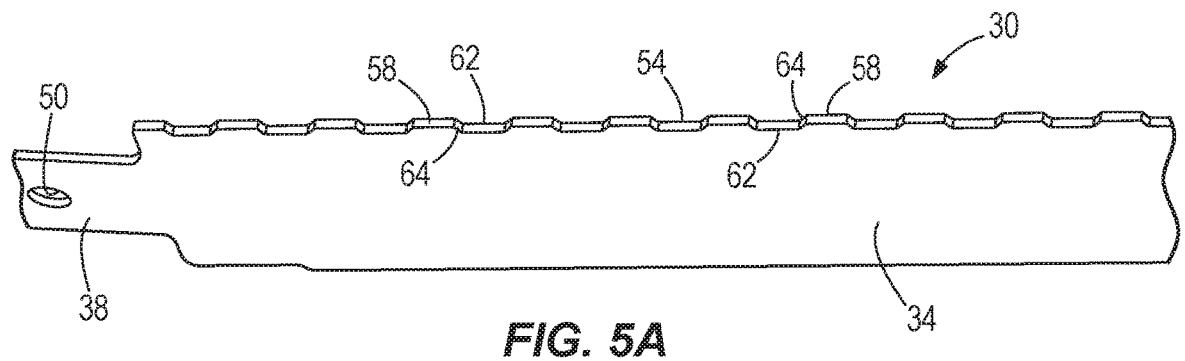
FIG. 5A is a perspective view of a saw blade blank having portions set in opposite directions, but no cutting teeth.
Figure 5B:
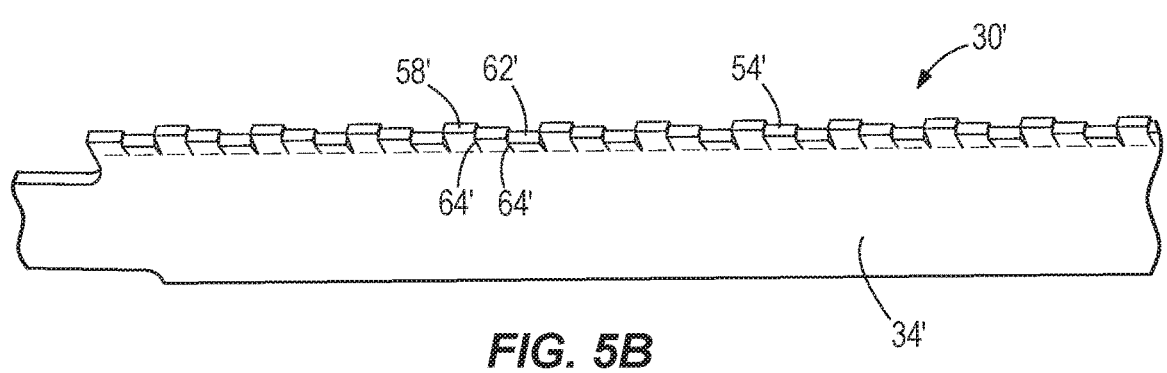
FIG. 5B is a perspective view of another saw blade blank having portions set in opposite directions, but no cutting teeth.

At step 14, the coil stock is blanked into a desired shape. For example, the coil stock may be stamped or cut to form one or more reciprocating saw blade blanks 30 (FIGS. 3, 5A, and 5B). A "blank" refers to a piece of coil stock without cutting teeth. In the illustrated embodiment, each blank has the general overall shape of a finished blade, including a body 34, an attachment portion 38, and a cutting tip 42, but does not include cutting teeth. The illustrated attachment portion 38 includes a tang 46 and an aperture 50 configured to engage a reciprocating saw or other power tool. In other embodiments, the coil stock may be blanked into a jigsaw blade blank or hole saw blank without cutting teeth.

The saw blade blank 30 is also set at step 14. During setting, portions of the saw blade blank 30 are set (e.g., bent) out of alignment with the remainder of the blank 30. As shown in FIG. 5A, portions along an edge 54 of the body 34 (which later defines a cutting edge of the saw blade) are set in opposing directions relative to the body 34 such that the edge 54 is generally wave-shaped. For example, a first portion 58 may be set in a first direction relative to the body 34, while a second portion 62 may be set in a second direction relative to the body 34. Regions 64 between the first and second portions 58, 62 are contoured or radiused to provide relatively smooth transitions. In other embodiments, as shown in FIG. 5B, a blank 30' includes a body 34' having an edge 54' with more abrupt transition regions 64' between first and second portions 58', 62'. Such embodiments provide a shear profile along the edge 54'. In either of the illustrated embodiments, the set magnitudes in the first and second directions are generally the same. In other embodiments, the set magnitude in the first direction may be larger or smaller than the set magnitude in the second direction.

In some embodiments, the order of the blanking and setting operations may be reversed. For example, in alternative embodiments, portions of the coil stock may be set before the coil stock is machined into individual saw blade blanks.

FIGS. 3 and 4 illustrate a machine 66 for setting the saw blade blanks 30 of the coil stock. The machine 66 includes a press 70 to form a set pattern into each blank 30 before cutting teeth are formed in the blanks 30. The illustrated press 70 includes an upper die set 74 and a lower die set 78. Each die set 74, 78 includes a series of individual inserts 82A-C. During operation, a saw blade blank 30 is positioned between the upper and lower die sets 74, 78, and the die sets 74, 78 are pressed together such that the inserts 82A-C contact and bend the edge 54 of the blank 30 in a desired set pattern. In some embodiments, the blank 30 is positioned within the press 70 so that any stress risers created during setting are located in areas of the blank 30 that are later removed to form gullets between cutting teeth. In the illustrated embodiment, portions of the edge 54 of the blank 30 are set in opposing direction simultaneously. In other embodiments, some portions of the edge 54 may be set in a first direction, and then other portions of the edge may be set in a second direction.

In the illustrated embodiment, each die set 74, 78 includes three different groups of inserts 82A-C. The first group of inserts 82A is configured to set portions of the blank 30 in the first direction. The second set of inserts 82B is configured to set portions of the blank 30 in the second direction. The third set of inserts 82C is configured to maintain portions of the blank 30 as unset. In the illustrated embodiment, the inserts 82A-C are arranged to create a repeating set pattern of second direction, first direction, second direction, first direction, unset. In other embodiments, the inserts 82A-C may be rearranged to create other desired set patterns on the saw blade blank 30.

Referring back to FIG. 2, at step 18, cutting teeth 86 (FIGS. 6-8) are formed on the edge 54 of the saw blade blank 30. The cutting teeth 86 may be formed by grinding, laser cutting, or otherwise machining the teeth 86 into the edge 54. In the illustrated method, two grinders (or other suitable machines) are positioned downstream of the press 70 to form the cutting teeth 86 on two blanks 30 simultaneously. As shown in FIG. 7, each cutting tooth 86 includes a tip 90, a rake face 94 extending from the tip 90, and a relief face 98 extending from the tip 90 opposite the rake face 94. The grinders also form gullets 102 between each pair of adjacent cutting teeth 86. Once formed, the cutting teeth 86 and the gullets 102 define a cutting edge 106 of a saw blade 110.

Referring back to FIG. 2, at step 22, the saw blade 110 (FIGS. 6-8) is placed in a washer for cleaning. The washer removes grinding debris, coolant residue, and other excess materials from the blade 110.

After washing, a pick and place unit loads the saw blade 110 into a heat treat tray at step 26. The saw blade 110 is then heat treated, tempered, or otherwise hardened, as desired for a particular application. In some embodiments, the saw blade 110 may also be coated and/or painted before or after heat treating.

Figure 6:
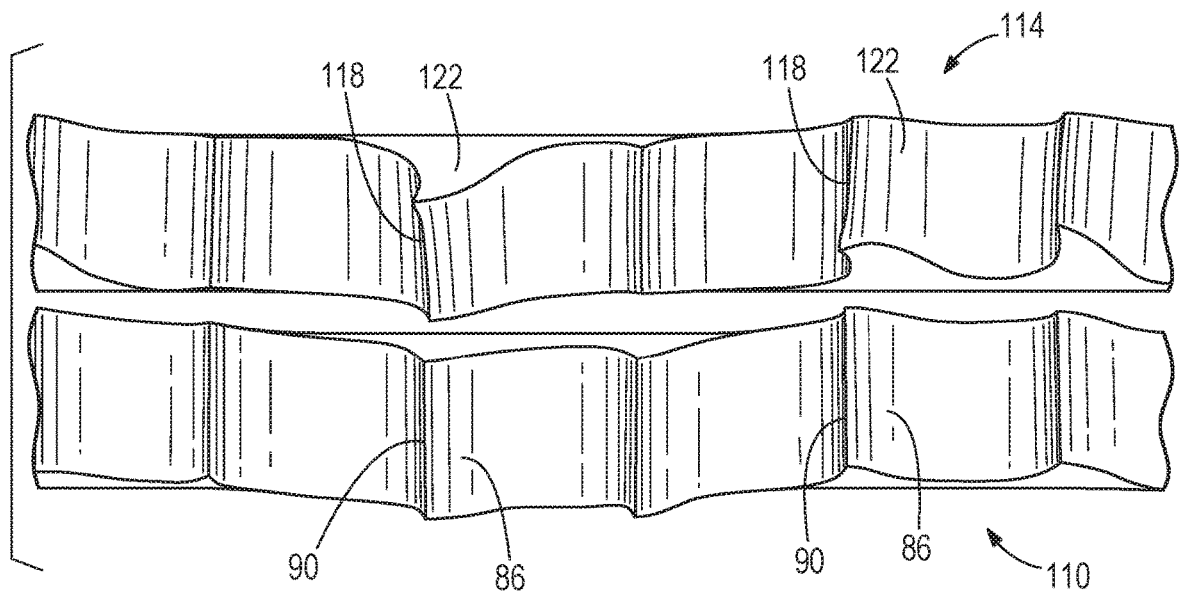
FIG. 6 is a top view of a first saw blade manufactured by the method of FIG. 1 and a second saw blade manufactured by the method of FIG. 2.
Figure 7:
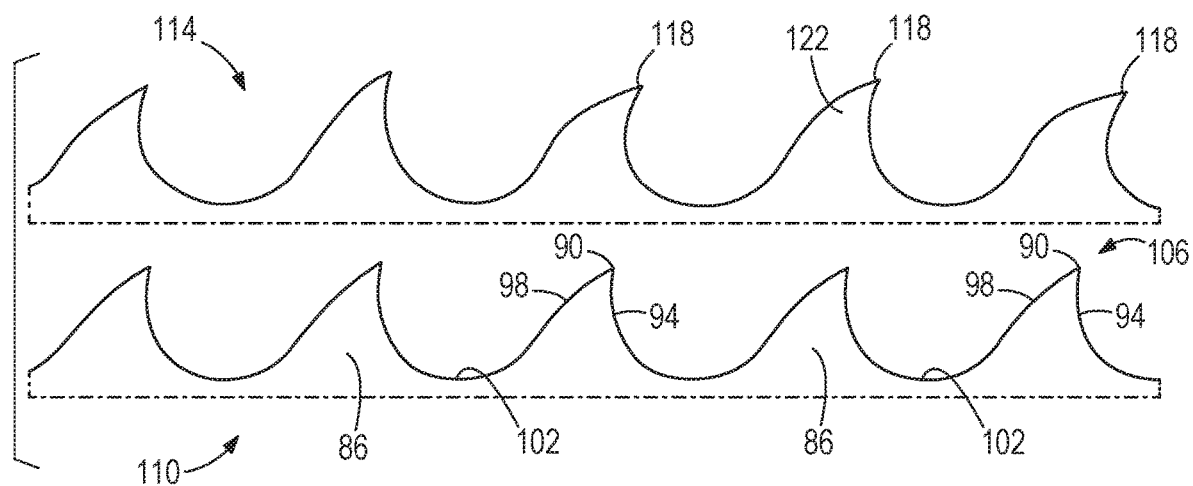
FIG. 7 is a side view of the first and second saw blades of FIG. 6.
Figure 8:
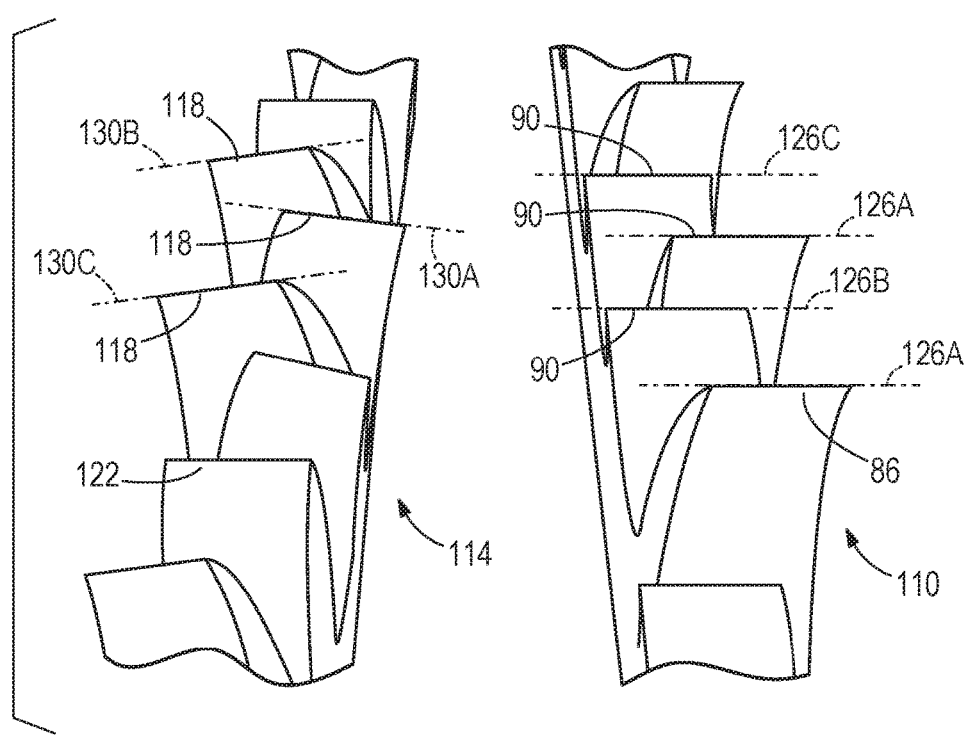
FIG. 8 is an end perspective view of the first and second saw blades of FIG. 6.

FIGS. 6-8 illustrate the saw blade 110 manufactured by the process of FIG. 2 compared to a saw blade 114 manufactured by the process of FIG. 1. As shown in FIG. 6, tips 118 of cutting teeth 122 of the saw blade 114 manufactured by the process of FIG. 1 may be excessively bent and damaged during setting. Such damage occurs because the cutting teeth 122 are contacted and set after the tips 118 are formed. In contrast, the tips 90 of the cutting teeth 86 of the saw blade 110 manufactured by the process of FIG. 2 are undamaged because the tips 90 are not contacted by additional machines after the tooth forming step.

In addition, as shown in FIG. 7, the shape and size of the cutting teeth 122 of the saw blade 114 manufactured by the process of FIG. 1 generally vary along the length of the saw blade 114. In particular, some of the cutting teeth 122 are generally wider and shorter than other cutting teeth 122. Such variations occur because the setting machine contacts and presses against the cutting teeth 122, which may unintentionally deform those teeth 122 relative to the other teeth 122. In contrast, all of the cutting teeth 86 of the saw blade 110 manufactured by the process of FIG. 2 are generally the same shape and size (within approved manufacturing tolerances) because the teeth 86 are not contacted by additional machines after they are formed.

Furthermore, as shown in FIG. 8, the tip 90, 118 of each cutting tooth 86, 122 defines a plane 126A-C, 130A-C that extends along a thickness of the corresponding saw blade 110, 114. The planes 130A-C defined by the tips 118 of the saw blade 114 manufactured by the process of FIG. 1 are skewed relative to each other. That is, the plane 130A defined by the cutting tooth 122 set in the first direction is different than the plane 130B defined by the cutting tooth 122 set in the second direction, and both planes 130A-B are different than the plane 130C defined by the unset cutting tooth 122. In contrast, the planes 126A-C defined by the cutting teeth 86 of the saw blade 110 manufactured by the process of FIG. 2 are all generally parallel to each other, regardless of the set orientation of a particular cutting tooth 86. In the illustrated embodiment, each of the planes 126A-C extends generally parallel to the thickness of the saw blade body 34. In other embodiments, the tips 90 of the cutting teeth 86 may be purposefully tilted relative to the body 34 such that the planes 126A-C likewise extend at an angle relative to the body 34. Since all of the illustrated cutting teeth 86 are generally the same height (within acceptable manufacturing tolerances), the illustrated planes 126A-C are also generally coplanar. In other embodiments, the cutting teeth 86 may be formed at different heights, yet the planes 126A-C defined by the tips 90 are still parallel.

Forming the cutting teeth 86 with parallel tips 90 helps evenly distribute a cutting load over the cutting teeth 86, thereby producing a smoother cut surface in a work piece. The configuration may also improve cutting speed of the saw blade 110, material removal from the work piece being cut, and/or cutting tooth durability (e.g., resistance to fracture, blade life, etc.).

The manufacturing process depicted in FIG. 2 reduces capital expenditures by not requiring multiple setting machines. Instead, a less expensive press 70 (FIG. 3) is used to set the saw blade blanks 30. In addition, the saw blades 110 produced by the method of FIG. 2 have more consistent tooth sets than saw blades produced by traditional setting processes (e.g., using the method of FIG. 1). For example, traditional saw blades may have a set variance or tolerance of +/−0.003 inches, while saw blades manufactured by the process of FIG. 2 have a set variance or tolerance of +/−0.0015 inches. Obtaining consistent product results (e.g., cutting tooth shape, size, and set magnitude) is highly desirable in manufacturing and for performance testing.

Although the invention has been described with reference to certain preferred embodiments, variations and modifications exist within the scope and spirit of one or more independent aspects of the invention.

Various features and advantages of the invention are set forth in the following claims.

What is claimed is:

1. A saw blade blank comprising:
a body having an edge; and
an attachment portion formed on the body, the attachment portion configured to connect to a power tool;
wherein a first portion of the edge is set in a first direction relative to the body, wherein a second portion of the edge is set in a second direction opposite the first direction relative to the body, and wherein no cutting teeth are formed on the edge of the body; and
wherein the edge of the body includes a series of portions set in alternating directions relative to the body.

2. The saw blade blank of claim 1, wherein a transition between the first portion of the edge and the second portion of the edge is radiused.

3. The saw blade blank of claim 1, wherein a transition between the first portion of the edge and the second portion of the edge is abrupt.

4. The saw blade blank of claim 1, wherein the first portion of the edge has a first set magnitude, wherein the second portion of the edge has a second set magnitude, and wherein the first and second set magnitudes are generally equal.

5. The saw blade blank of claim 1, wherein the first portion of the edge has a first set magnitude, wherein the second portion of the edge has a second set magnitude, and wherein the first and second set magnitudes are different.

6. The saw blade blank of claim 1, wherein a length of the first portion of the edge and a length of the second portion of the edge are generally the same.

7. The saw blade blank of claim 1, wherein the attachment portion includes a tang and an aperture.

8. The saw blade blank of claim 7, further comprising a tip formed on the body opposite from the attachment portion.

9. The saw blade blank of claim 1, wherein a third portion of the edge is unset relative to the body.

10. The saw blade blank of claim 9, wherein the third portion of the edge is located directly between the first portion of the edge and the second portion of the edge.

11. The saw blade blank of claim 1, wherein the body has an overall shape of a finished saw blade, without cutting teeth.

12. The saw blade blank of claim 11, wherein the overall shape is the overall shape of a reciprocating saw blade.

13. A saw blade blank comprising:
a body having an edge;
an attachment portion formed on the body, the attachment portion including a tang and an aperture, the attachment portion configured to connect to a power tool; and
a tip formed on the body opposite from the attachment portion;
wherein a first portion of the edge is set in a first direction relative to the body, wherein a second portion of the edge is set in a second direction opposite the first direction relative to the body, and wherein no cutting teeth are formed on the edge of the body.

14. The saw blade blank of claim 13, wherein a third portion of the edge is unset relative to the body.

15. The saw blade blank of claim 14, wherein the third portion of the edge is located directly between the first portion of the edge and the second portion of the edge.

16. The saw blade blank of claim 13, wherein the body has an overall shape of a finished saw blade, without cutting teeth.

17. A saw blade blank comprising:
a body having an edge; and
an attachment portion formed on the body, the attachment portion configured to connect to a power tool;
wherein a first portion of the edge is set in a first direction relative to the body, wherein a second portion of the edge is set in a second direction opposite the first direction relative to the body, wherein a third portion of the edge is unset relative to the body, and wherein no cutting teeth are formed on the edge of the body.

18. The saw blade blank of claim 17, wherein the third portion of the edge is located directly between the first portion of the edge and the second portion of the edge.

19. The saw blade blank of claim 17, wherein the first portion of the edge has a first set magnitude, wherein the second portion of the edge has a second set magnitude, and wherein the first and second set magnitudes are generally equal.

20. The saw blade blank of claim 17, wherein the first portion of the edge has a first set magnitude, wherein the second portion of the edge has a second set magnitude, and wherein the first and second set magnitudes are different.

* * * * *